UNITED STATES PATENT OFFICE.

FRIEDRICH GROSSMANN, OF KÖNIGSWINTER, GERMANY, ASSIGNOR TO HEINRICH SCHMITS, OF HERNE, GERMANY.

REFRACTORY SUBSTANCE.

951,113.     Specification of Letters Patent.     Patented Mar. 8, 1910.

No Drawing.     Application filed September 20, 1909. Serial No. 518,495.

*To all whom it may concern:*

Be it known that I, FRIEDRICH GROSSMANN, a subject of the German Emperor, residing at Königswinter, Germany, have invented a new and useful Refractory Substance, of which the following is a specification.

The subject of the present invention is a substance which is suitable for use as a refractory material. In particular the material can be advantageously used to make crucibles, fireproof bricks for lining furnaces of all kinds, and even fire bars.

The constituents of the new substance are kaolin, magnesia, bauxite, iron filings, and sand, together with the water necessary to make a plastic or pulpy mass. For the sand it is best to use refractory polishing sand.

The proportion of the constituents is preferably the following: kaolin 50%, magnesia 20%, bauxite 10%, iron filings 10% and sand 10%.

The following process is suggested for the production of the new material, and for the manufacture of articles from the same. The constituents, kaolin, magnesia, and bauxite are first of all separately treated. The kaolin is allowed to soften for two or three hours in water, the bauxite and the magnesia are powdered, the bauxite after it has been previously burned, and these constituents also are then mixed with water and allowed to stand for two or three hours before being further treated. A mixture is next made from the constituents treated as above mentioned, with iron filings and sand, which mixture is allowed to stand for at least 24 hours, and it is then ready to be molded into the fireproof articles required. In order to facilitate the molding, water can be added as required. The molded articles are then dried and then burned at a temperature of at least 800° centigrade to 900° centigrade for at least 30 hours. The mixture may moreover, before it is molded into articles, be kept for some time and transported. The water which evaporates in the meantime can be easily replaced.

It is to be especially noticed that the times given for each step of the process are minimum periods. A greater period favorably influences the quality of the product.

What I claim is:

1. A refractory substance, consisting of a mixture of kaolin, magnesia, bauxite, iron filings and sand.

2. A process for the production of a refractory substance consisting in treating kaolin, powdered burned bauxite, and powdered magnesia separately for at least two to three hours with water, whereupon a mixture is made of the above mentioned constituents with iron filings and sand, which mixture is allowed to stand for at least twenty four hours before further use.

3. A process for the manufacture of fireproof articles consisting in molding the articles from a mixture of kaolin, magnesia, bauxite, iron filings and sand, and burning them, after drying for at least 30 hours at a temperature of from 800° centigrade to 900° centigrade.

In testimony whereof I have signed my name to this specification in the presence of two subscribing witnesses.

FRIEDRICH GROSSMANN.

Witnesses:
   R. BADEWIG,
   LOUIS VANDORF.